United States Patent [19]

Toyoda et al.

[11] Patent Number: 5,016,186

[45] Date of Patent: May 14, 1991

[54] METHOD OF DETECTING NOISE DISAPPEARANCE AND DETECTING DEVICE THEREFOR

[75] Inventors: Ichiro Toyoda; Toshihiko Niinomi, both of Hiroshima; Shigeru Kaseda; Koichi Takahashi, both of Aichi, all of Japan

[73] Assignees: Mitsubishi Jukogyo Kabushiki Kaisha; Idemitsu Kosan Company Limited, Tokyo, Japan

[21] Appl. No.: 307,872

[22] Filed: Feb. 7, 1989

[30] Foreign Application Priority Data

Feb. 9, 1988 [JP] Japan .............................. 63-26505
Apr. 7, 1988 [JP] Japan .............................. 63-46224[U]

[51] Int. Cl.$^5$ .................. G06F 15/20; G06F 15/46
[52] U.S. Cl. .................................. 364/507; 73/592; 364/484; 364/550
[58] Field of Search ............... 364/507, 508, 505, 572, 364/574, 576, 484, 724.01, 724.06, 724.08, 724.09, 550, 551.01, 509, 510; 73/457, 592, 593, 659, 660, 117.2, 116; 324/613, 500

[56] References Cited

U.S. PATENT DOCUMENTS

| | | | |
|---|---|---|---|
| 4,408,294 | 10/1983 | Imam | 364/507 |
| 4,462,081 | 7/1984 | Lehan | 364/572 |
| 4,493,042 | 1/1985 | Shima et al. | 364/507 |
| 4,514,797 | 4/1985 | Begin | 364/507 |
| 4,562,548 | 12/1985 | Andersen et al. | 364/483 |
| 4,587,620 | 5/1986 | Niimi et al. | 364/574 |
| 4,617,630 | 10/1986 | Zwicke et al. | 364/507 |
| 4,635,214 | 1/1987 | Kasai et al. | 364/507 |
| 4,635,217 | 1/1987 | O'Connor et al. | 364/572 |
| 4,684,989 | 8/1987 | Roeder et al. | 364/574 |
| 4,718,028 | 1/1988 | Gussin et al. | 364/572 |
| 4,751,657 | 6/1988 | Imam et al. | 364/507 |

*Primary Examiner*—Kevin J. Teska
*Attorney, Agent, or Firm*—Flynn, Thiel, Boutell & Tanis

[57] ABSTRACT

A method and apparatus detect a noise disappearance of instruments, etc. in various instrumentations in a chemical plant or the like. Detection values which are outputs from a detector (1) are input into a data store (3) via a data collector (2). Inputs to a processor (4) are a detection value (Sold) at a previous point and time from the data storer (3) and further a current detection value serving as a newest value (Snew) from the data collector (2). In the processor (4), an absolute difference between the newest value (Snew) and the previous value (Sold) is calculated. When this difference is smaller than a preset value, a count number (C) of a counter (5) is incremented, whereas when this difference is larger than the preset value, the count number (C) is cleared. When the count number from the counter (5) exceeds a predetermined threshold value, this is regarded the occurrence of a noise disappearance, and a trigger signal (T) for actuating a notifier (7) is output from a limiter (6).

8 Claims, 5 Drawing Sheets

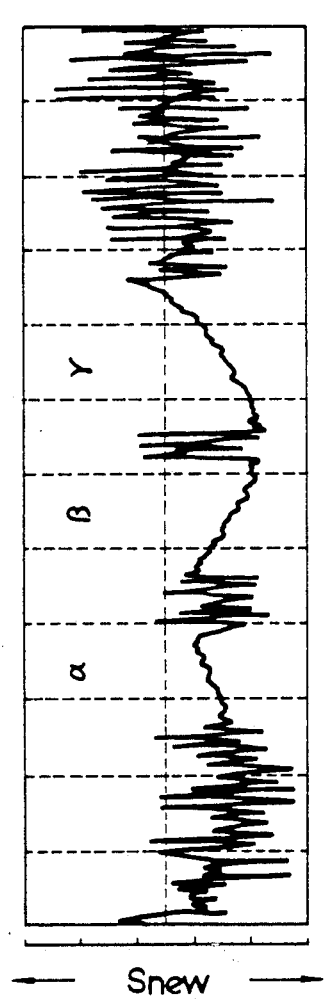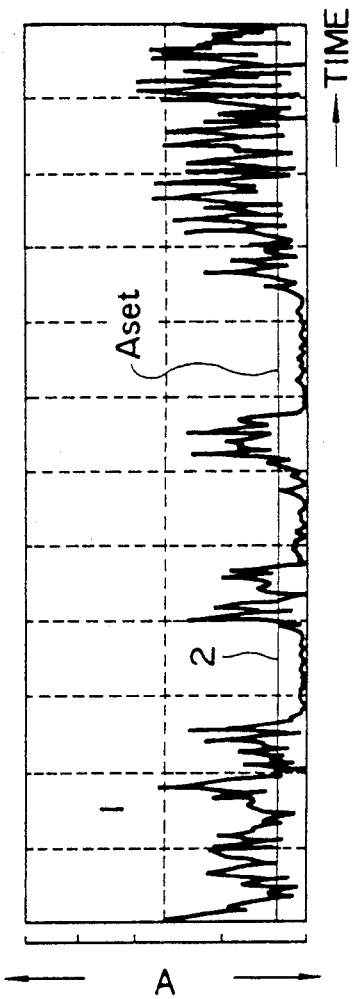

METHOD OF DETECTING NOISE DISAPPEARANCE AND DETECTING DEVICE THEREFOR

BACKGROUND OF THE INVENTION

1. Field of the Invention

The present invention relates to a method and apparatus for detecting a noise disappearance, wherein output signals from a detector are received successively and a decreased noise component concerned with process vibrations and included in the output signal due to a fault of a plant (sticking of a valve, blocking of a piping, etc.) or a trouble in an instrument itself is detected, thereby detecting the plant fault or the trouble in the instrument itself.

2. Description of the Related Art

It has heretofore been difficult to detect a fault of the plant or the instruments at an early stage because, in most cases, operators did not sense the fault of the instruments, etc. until serious faults occur in a process. Particularly, after adoption of the DCS instrumentation, it has become difficult to understand a deviation with time of detected values using only digital values, and further, to detect a fault. In addition, it is difficult to provide a device exclusively used for sensing the fault from the viewpoint of economics.

Therefore, there has been proposed a device for detecting almost no change in an output signal from a detector provided in a plant, and then giving a predetermined alarm indicating the occurrence of a fault in the plant or the detector.

As shown in FIG. 4 for example, in this device, if the output signal falls into a preset abnormality determining value range having upper and lower limits (between HL and LL), the fact that the output value continues to be hardly changed is determined to be an abnormality by a determining system in which a difference of the output value from a certain reference value becomes continuously small.

However, when the modes of abnormality occurrence in the plant due to faults of the detectors, blocking of the piping and the like are taken into consideration, it is not sufficient to merely look for a state of no change in the output signal from the detector as in the conventional techniques. More specifically, with actual abnormalities, there are many cases where, even if the output signal of the detector fluctuates by increasing or decreasing, noise components which should be intrisically included in the fluctuation of the signal decrease due to the abnormality, and it is unavoidable that the abnormality described above cannot be detected by the conventional technique. This is because the reference value during the occurrence of the abnormality is used in a fixed manner, that is, a detected value is merely compared with the reference value which is not renewed or updated.

Fluctuations of the process are divided into two types. One type of fluctuation of the process involves low frequency waves which occur in a case where the operating conditions of the process are changed or disturbances take place in the process. In this case, the value of the process changes relatively moderately. On the other hand, even when the stable operation is performed with no change being given to the process, if a liquid surface is shaken or pulsations in the flow rate normally occur due to conveyance by a pump, then there occurs the other type of fluctuation of the process, which involves high frequency waves such as noises.

When the latter fluctuations are observed, it may be said that the output value is normal. Accordingly, in order to perform noise disappearance detecting with high accuracy, it is desirable that the former low frequency fluctuations and the latter high frequency fluctuations be monitored separately from each other.

As a specific example, the assumption is made that a differential pressure type level meter used as a detector is provided in a plant and detects a level of a liquid surface in a vessel. The above-described level meter and vessel are connected to each other through a conduit.

In general, it might seem that the output signal from the level meter falls into a state of no change if the interior of the conduit becomes blocked. In practice, however the pressure in the conduit is varied with time due to the condensation and contraction of the vapor phase in the conduit and, in many cases, the output signal from the detector continues to increase or decrease. And yet, even in these cases, the high frequency vibration components included in the output signal decrease, but there has been presented the problem that the noise disappearance cannot be detected by the conventional technique where the output signal shows the incrase or decrease.

SUMMARY OF THE INVENTION

Therefore, the present invention has been developed to solve the above-described disadvantages of the prior art and has as its object the provision of a method and apparatus for detecting noise disappearance wherein data from successive sampling are processed by a relatively easy technique and, when a noise disappearance phenomenon occurs in detected output signals due to some abnormality or other, the phenomenon is quickly detected and an operator is notified of it.

The objects and purposes of the invention, including those set forth above, are met by providing a method apparatus which involves monitoring of a noise component from a detector and the generation of a warning if the noise component decreases substantially for a predetermined time period.

On a more specific level, the monitoring is carried out by periodically calculating an absolute difference between the newest (current) value from the detector and a past value produced by the detector a predetermined period of time earlier, and, when the time during which the value of the absolute difference is continuously smaller than a preset value becomes larger than a preset time which has been determined to be abnormal, the situation is regarded as occurrence of a noise disappearance phenomenon and the operator is notified of it.

Furthermore, a threshold value renewing device can receive the outputs from a counter and in response to a threshold value renewing request signal can determine the maximum value of the counter outputs during a predetermined period of time after receiving this threshold value renewing request signal and then output the limiter means as a new threshold value of the maximums value to a limiter.

In detecting the noise disappearance, in order to detect it as quickly as possible, it is necessary to minimize the threshold value. Of course, this may result in a factor causing the occurrence of erroneous alarm information. On the other hand, it is very difficult to set in advance a threshold value for determining an abnormality. According to the present invention, in setting the threshold value, a normal range can be empirically determined based on data associated with the characteristics of the respective detectors and changes in the operating conditions, etc.

According to the present invention, the above-described process can be easily performed and unsuitable setting of the parameters which contributes to mistaken alarm information or a time delay in giving the alarm can be avoided.

Incidentally, the term "noise disappearance" in this specification refers to a case where the intrinsic high frequency vibration component included in the fluctuation, etc. of the process is decreased to a considerable extent.

BRIEF DESCRIPTION OF THE DRAWINGS

FIGS. 2(A) through 2(D) are charts showing output signals in various sections of the device shown in FIG. 1;

DETAILED DESCRIPTION OF THE PREFERRED EMBODIMENTS

Embodiments of the present invention will hereunder be described with reference to the accompanying drawings.

Figure 1:
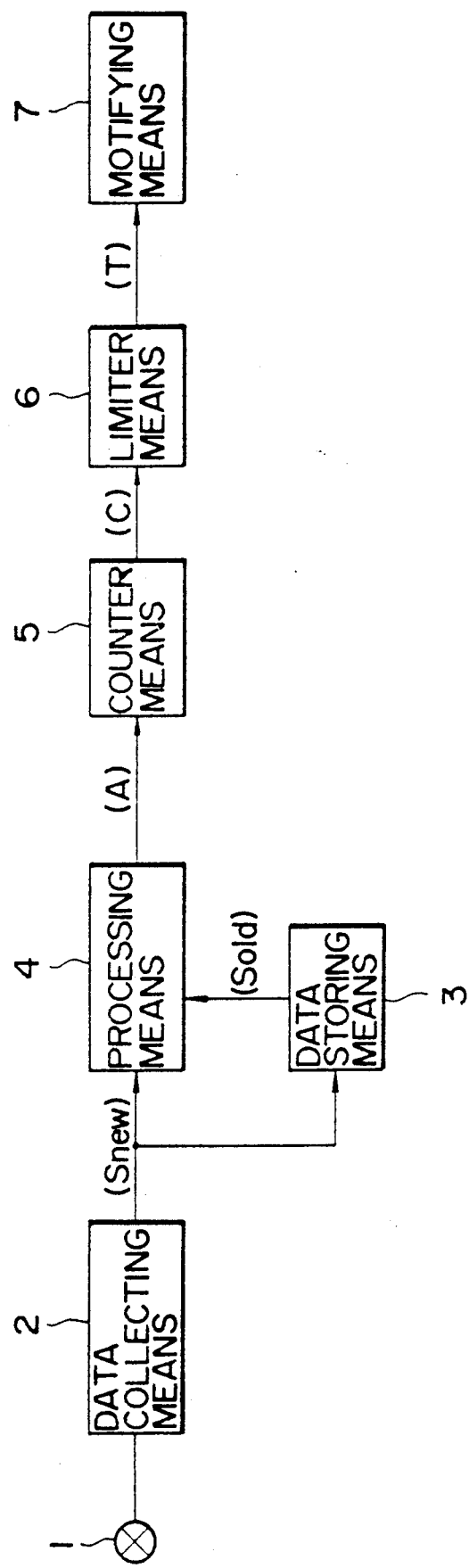
FIG. 1 is a block diagram of a noise disappearance detecting device embodying the present invention.

In FIG. 1 which shows one embodiment implementing the method according to the invention, output signals from a detector 1 are successively collected by a data collecting device 2 whose output signals are successively input into data storing device 3 and stored therein as past value data which is to be output to a processing device 4. The processing device 4 receives the output signal from the data collecting device 2 as the newest or current value (Snew) of the detector 1, and receives an output signal from the data storing device 3 which is a preceding value (Sold) of the detector 1, the preceding value being used as the past value obtained a predetermined period of time before the current value, and the processing device calculates an absolute value of a difference as shown in the following equating (1) at each data collection time, and outputs the result (A) into a counter device 5.

$$A = |Snew - Sold| \qquad (1)$$

The counter device 5 receives each output signal from the processing device 4 and compares the output signal with a present value (Aset) (a value which is smaller than the vibrations of a normal signal). When the output signal from the processing device 4 is not larger than the preset value, the count number (C) in the counter device 5 is incremented. When the output signal of the processing device 4 is larger than the present value, the count number (C) in the counter 5 is cleared. Namely, when $A < Aset, C = Cold + 1$ \qquad 2(a)

When $A \geq Aset, C = 0$ \qquad 2(b)

A limiter device 6 receives an output signal (C) from the counter device 5 and compares the output signal with a preset value (Cset) (representing a period of time during which a noise disappearance can be detected. When the output signal (C) of the counter device 5 exceeds (Cset), a trigger signal (T) is turned "ON". When the output signal (C) of the counter device 5 is smaller than (Cset), the trigger signal (T) is turned "OFF". When the trigger output signal (T) of the limiter device 6 is "ON", a notifying device 7 notifies the operator of the result, i.e. the occurance of noise disappearance phenomenon, by means of a CRT, a printer, an annunciator or the like.

FIGS. 2(A) through 2(D) show examples of output signals of various components shown in FIG. 1.

Figure 2C:
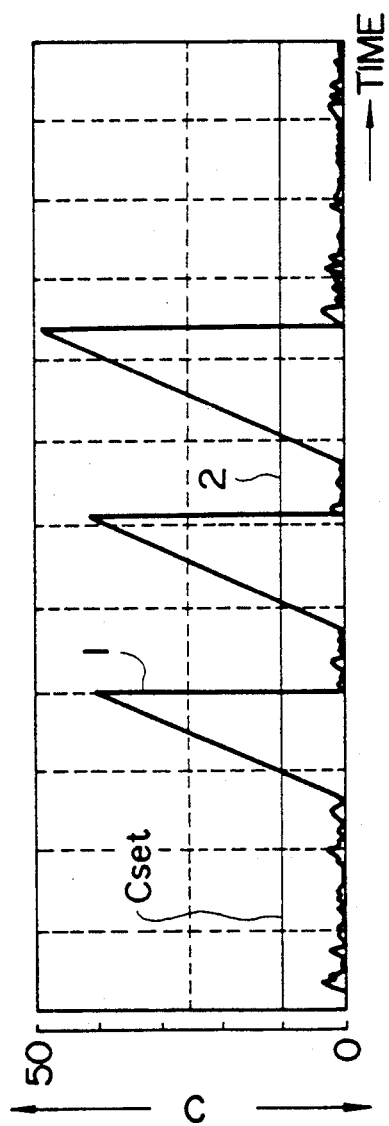
Figure 2D:
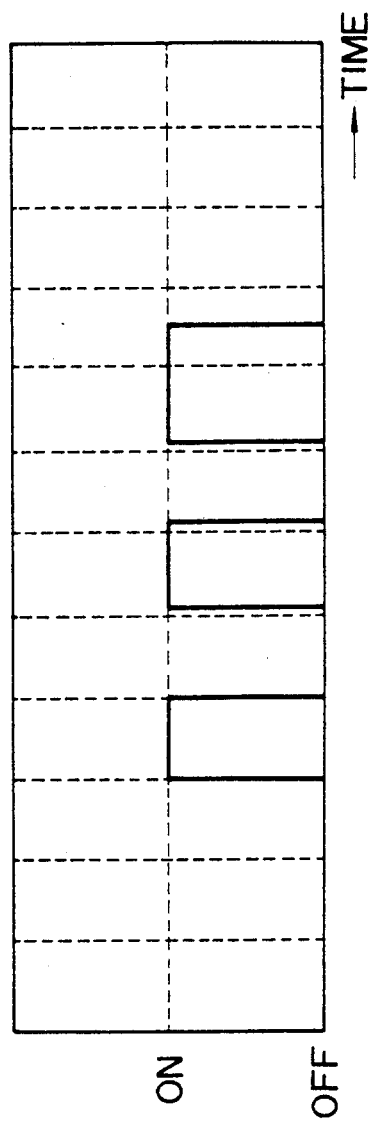

FIG. 2(A) shows an example of the output signal (Snew) from the data collecting device 2, corresponding to the fluctuation with time of the signal of the detector 1. ① of FIG. 2(B) shows an example of the output signal (A) from the processing device 4, which is obtained by taking the absolute value of the difference between the newest or current value from the data collecting device 2 and a preceding value from the data storing device 3 which is successively renewed or updated ② of FIG. 2 (B) shows an example of a preset value (Aset) of the counter device 5. ① of FIG. 2(C) shows an example of the output signal (C) of the counter device 5, when the input signal of the counter device 5 which is output signal ① of FIG. 2(B) becomes smaller than the peset value. ② of FIG. 2(C) shows an example of the threshold value (Cset) of the limiter device 6, and FIG. 2(D) shows an example of the trigger output signal (T) of the limiter device 6 when the counter number shown in FIG. 2(C) exceeds the threshold value.

Now, as shown in FIG. 2(A), description will hereunder be given of a case where the noise disappearance phenomena occurs at three positions $\alpha$, $\beta$ and $\gamma$ in the drawing.

During the normal periods of time other than $\alpha$, $\beta$ and $\gamma$, the absolute difference (A) between the present time value and the preceding time value, which is the output from the processing device 4, is larger than the preset value (Aset), whereby the count number (C) output the counter device 5 is small and does not exceed the preset value (Cset). However, during the periods of $\alpha$, $\beta$ and $\gamma$ in FIG. 2(A) where the noise disappearance phenomena occurs, the absolute difference (A) between the newest time value and the preceding time value, which are the output signals from the processing means 4, becomes smaller than the preset value (Aset), whereby the count number (C) output from the counter device 5 increases and exceeds the threshold value (Cset). Then, the trigger signal (T) is output to the notifying device 7 by the limiter device 6, to thereby notify the operator of the occurance of the noise disappearance phenomena. Incidentally, when the output signals from the detector 1 return to the normal conditions, the trigger signal (T) is turned off and the alarm is released.

According to the embodiment as described above, an arrangement is adopted which calculates the absolute difference between the preceding time value and the newest time value of the detected values and decides whether the absolute difference is larger than the preset value or not, so that, even if only a noise component of the detected value signal decreases in the regions $\alpha$, $\beta$ and $\gamma$ shown in FIG. 2(A), the detection of it can be made with high accuracy.

Figure 3:
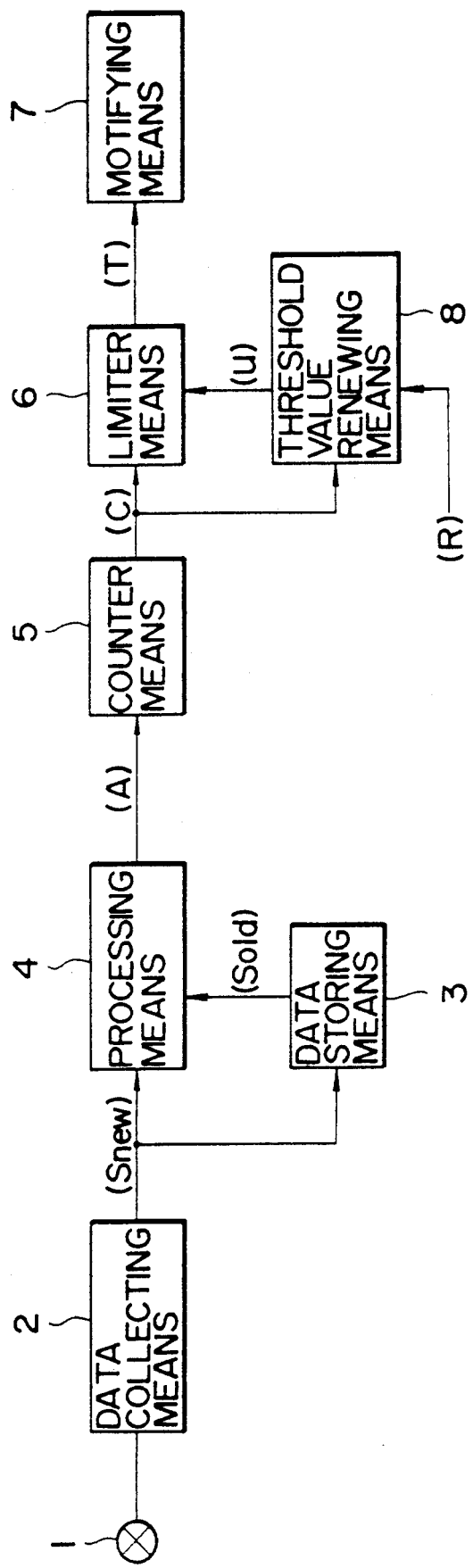
FIG. 3 is a block diagram of an alternative embodiment of the noise disappearance detecting device of FIG. 1.
Figure 4:
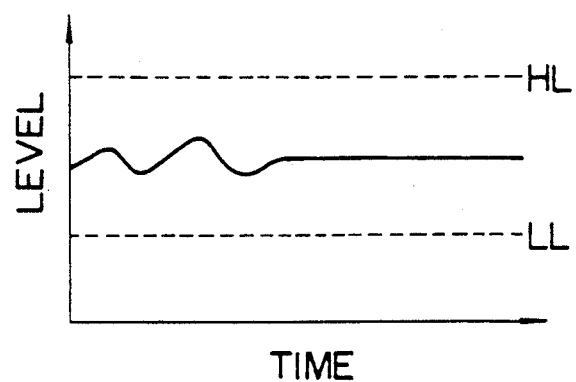
FIG. 4 is a chart showing an operational signal of a conventional fault detecting device.

Another embodiment implementing a method according to another aspect of the invention is described with reference to FIG. 3. In FIG. 3, the same reference numerals are used to designate parts corresponding to parts in the embodiment described above, so that a description can be omitted or simplified.

As shown in FIG. 3, this embodiment includes a threshold value renewing device 8 which receives the output from the counter device 5 and receives a threshold value renewal request signal (R), and which outputs a threshold renewed value (u) to the limiter device 6.

With the above-described arrangement, (1) a threshold value renewal request signal (R) is given as necessary in a case where the operating condition is changed, and serves as a calculation start signal for renewing or updating a threshold value based on the output from the counter device 5 which is input into the threshold value renewing device 8. Upon receiving the threshold value renewal request signal (R), the threshold value renewing device 8, after collecting the count number outputs from the counter device 5 during a predetermined period of time, identifies the maximum count number value during such period and outputs it as the new threshold renewed value (u) to the limiter device 6.

(2) On the other hand, the limiter device 6 acts similarly to the first embodiment until the time at which the threshold value renewal indication signal (R) is activated. Thereafter, the limiter device 6 receives the threshold renewed value (u) as a new threshold value, identifies the occurance of a noise disappearance phenomena when the output value from the counter device 5 exceeds the renewed threshold value (u), and outputs a trigger signal (T) to the notifying device 7.

According to this embodiment, the threshold value of the limiter device 6 is determined based on the threshold value renewal request signal (R) to the threshold value renewing device 8 such that the integrated value in the counter device 5 is statistically observed over a relatively long period of time and the threshold value is determined on the basis of the maximum value, thereof so that as a meritorious effect a noise disappearance detecting device having higher reliability is obtained.

Incidentally, in the embodiment of FIG. 3, the absolute difference between the newest value and the past value successively calculated and compared with the preset value. However, in place of the above, an arrangement may be adopted in which when the absolute value between the newest value and the past value calculated in the processing device 4 exceeds a preset value, a reset signal is output from the processing device 4 to the data storing device 3, and a detected value from currently being output by the data collecting device 2 when this reset signal is received, is stored in the data storing device 3 as a past value, and is output by device 3 to the processing device 4.

As has been described hereinabove, the present invention provides a method and apparatus for detecting a noise disappearance, wherein a noise disappearance phenomenon can be detected by relatively simple processing. Furthermore, in setting the threshold value, a normal range can be empirically determined by taking in data in association with the characteristics of the respective detectors and the changes in the operating conditions, etc. Further, on the basis of the interrelations between the magnitudes of fluctuations of the detection signals and the threshold values of the count numbers, it becomes possible to examine what kind of result follows when one of the parameters is determined, and thereafter, the other is changed. Since this method and apparatus for detecting a noise disappearance adopt a simple logic, the logic can be included in a computer assembled in the plant, monitoring of the noise disappearance in detection values in a large quantity can be performed without requiring so much load of the computer, and a period of time for observing detection values necessary for determining the noise disappearance can be automatically determined.

What is claimed is:

1. A method of detecting a substantial reduction of a noise component, comprising the steps of:

storing in data storing means output signals issued from data collecting means for successively collecting signals from a detector;

processing by a processing means an absolute defference between the output signal currently issuing from said data collecting means and one of the output signals stored in said data storing means;

incrementing a count number of a counter means when said absolute difference from said processing means is smaller than a preset difference, and clearing said count number when said absolute difference is larger than said preset difference; and issuing a predetermined alarm when the count number is greater than a preset threshold value to indicate the substantial reduction of a noise component even if the signals from the detector fluctuate.

2. A method of detecting a substantial reduction of a noise component, comprising the steps of:

storing in data storing means output signals issued from data collecting means for successively collecting signals from a detector;

processing by a processing means an absolute difference between the output signal currently issuing from said data collecting means and one of the output signals stored in said data storing means;

incrementing a count number of a counter means when said absolute difference from said processing means is smaller than a preset difference, and clearing said count number when said absolute difference is larger than said preset difference;

issuing a predetermined alarm when the count number is greater than a threshold value to indicate the substantial reduction of a noise component; and changing said threshold value to be a maximum value of said count number occurring during a predetermined period of time following receipt of a threshold value renewing request signal.

3. A detecting device for detecting a substantial reduction of a noise component, comprising:

data collecting means for successively collecting signals from a detector;

data storing means for storing output signals issued from said data collecting means;

processing means for processing and outputting an absolute difference between the output signal currently issuing from said data collecting means and one of the output signals stored in said data storing means;

counter means for incrementing a count number therein when said absolute difference is smaller than a preset difference, and for clearing said count number when said absolute difference is larger than said preset difference;

limiter means responsive to said count number for outputting a trigger signal when said count number is greater than a preset threshold value; and notifying means for issuing an alarm in response to said trigger signal in order to indicate the substantial reduction of a noise component even when other components of the signals from said detector fluctuate.

4. A detecting device for detecting a substantial reduction of a noise component comprising:

data collecting means for successively collecting signals from a detector;

data storing means for storing output signals issued from said data collecting means;

processing means for constantly receiving and for outputting an absolute difference between the output signal currently issuing from said data collecting means and one of the output signals stored in said data storing means;

counter means for incrementing a count number therein when said absolute difference is smaller than a preset difference, and for clearing said count number when said absolute difference is larger than said preset difference;

limiter means responsive to said count number for outputting a trigger signal when said count number is greater than a threshold value;

notifying means for issuing an alarm in response to said trigger signal; and threshold value renewing means responsive to a threshold value renewing request signal for changing said threshold value to a maximum value of said count number occurring during a predetermined period of time following receipt of said threshold value renewing request signal.

5. An apparatus comprising: first means for monitoring operation of a piece of equipment having an operational condition, including detector means for monitoring said operational condition and for producing a signal having an information component representing said operational condition and having a noise component; and second means for detecting a fault, said second means including means responsive to a substantial reduction of said noise component throughout a predetermined time interval for generating an operator perceptible warning.

6. An apparatus as recited in claim 5, wherein said means responsive to a substantial reduction in said noise component includes collecting means for outputting a signal representing a current state of said noise component; storing means for storing said signal from said collecting means for a predetermined time period, and processing means for periodically calculating the absolute value of a difference between the signal currently being output by said collecting means and a signal stored in said storing means for said predetermined time period, and means for generating said operator perceptible warning when said absolute value of said difference remains below a preset value for said predetermined time interval.

7. An apparatus as recited in claim 6, wherein said means responsive to a substantial reduction in said noise component includes counter means for incrementing a count each time said absolute value of said difference calculated by said processing means is below said preset value and for clearing said count each time said absolute value of said difference calculated by said processing means is greater than said preset value, and means for generating said operator perceptible warning when said count is above a threshold value.

8. An apparatus as recited in claim 7, wherein said means responsive to a substantial reduction in said noise component includes threshold renewing means responsive to a selectively actuable threshold renewal signal for monitoring said count from said counter means for a predetermined period of time in order to determine the maximum value of said count during said predetermined time, and for thereafter changing said threshold value to equal said maximum value of said count.

* * * * *